Patented Apr. 3, 1923.

1,450,675

UNITED STATES PATENT OFFICE.

CHARLES M. STINE, OF WILMINGTON, DELAWARE, ASSIGNOR TO E. I. DU PONT DE NEMOURS AND COMPANY, OF WILMINGTON, DELAWARE, A CORPORATION OF DELAWARE.

PROCESS OF SEPARATING ISOMERIC TRINITROTOLUENES.

No Drawing.   Application filed November 5, 1917.   Serial No. 200,369.

*To all whom it may concern:*

Be it known that I, CHARLES M. STINE, of Wilmington, in the county of New Castle and in the State of Delaware, have invented a certain new and useful Improvement in Processes of Separating Isomeric Trinitrotoluenes, and do hereby declare that the following is a full, clear, and exact description thereof.

The object of my invention has been to provide a process of separating mixtures of nitro-aromatic hydrocarbons, to obtain at least one constituent, by the use of solvents, which shall have, among other advantages, one or more of the following: That of avoiding the necessity of dissolving, to any great degree, one of the two or more constituents into which the mixture is to be separated; reducing the total consumption of solvent, as well as the original amount of solvent, which must be employed, compared with prior methods; reducing the amount of heat utilized in the process.

Prior to my invention, mixtures of nitrotoluols have been separated into two constituents, or groups of constituents, by dissolving said mixtures in suitable solvents, and subsequent fractional crystallization of the solids either by cooling the solutions or by partial evaporation of the solution.

This prior process has the disadvantage of requiring an original amount of solvent sufficient to dissolve the entire mixture, and the total consumption of solvent is correspondingly great. Said process also involves an undesirably large consumption of power in the form of heat, as heat must be used in bringing the temperature of the solvent to the proper point to dissolve the mixture and in the subsequent evaporation of a portion of the solution in order to bring the concentration of the residual solution to a point where crystallization is brought about.

My new process effects the separation of such mixtures of nitro aromatic hydrocarbons into two or more constituents, or groups of constituents, by dissolving all the solids or liquids, except the constituent or group of constituents which it is desired to separate from the remaining constituents, in a solvent acting more strongly on the undesired constituent or group of constituents than on the desired constituent; or, vice versa.

The mixture to be treated by my process is preferably prepared in such form as to present a large surface to the action of the selected solvent, such as in finely-divided form or in the form of porous pellets. The solvent preferred is one which will attack to the least extent the constituent of the mixture which it is desired to obtained in pure form.

Many forms of apparatus are suitable for the practice of my invention. For instance, the mixture of nitrotoluols, finely divided as above described, may be spread out on a filter provided with a suitable medium for retaining the solids desired, and the selected solvent may be allowed to flow over the mixture.

Or a cylinder, having a false bottom, and having suitable inlets along the sides or near the top of the cylinder for the introduction of solvent, may be used in the practice of my process. The cylinder may be charged with the finely-divided mixture of solids, or of liquids and solids, and cold or heated solvent, or a mixture of solvents, allowed to flow slowly through the porous mass.

The result of practicing my invention is the removal or separation of the more soluble constituents of the mixture and the obtaining of a residual solid or liquid which has been separated from the more soluble constituents, or purified from the admixture of undesired components.

As a specific example of the practice of my process, I shall describe the purification of the crude product obtained from the nitration of toluol, by means of cold carbon tetrachloride. The said crude product obtained by the nitration of toluol consists of a mixture of a number of trinitrotoluols which are isomeric, but only one of which constitutes the trinitrotoluol of commerce, and the problem is to separate this desirable isomer from the other isomers. The solubility of the desired trinitrotoluol in cold or slightly warmed carbon tetrachloride is very small, while the solubility of the undesired isomers in that solvent is considerably greater, and I, accordingly, use cold or slightly warmed carbon tetrachloride as the solvent in this particular instance.

By subjecting the crude product from the nitration of toluol, in the form of fine grains or in the form of porous pellets, to the action of the solvent mentioned, I am enabled to extract the undesired components of the mixture without appreciably dissolving the desired isomer. This purification can well be carried out by placing 100 parts by weight of the trinitrotoluol in a suitable form on false bottom filters, and running over the layer of solid trinitrotoluol, by means of a suitable distributor, sufficient carbon tetrachloride to dissolve the undesired isomers of trinitrotoluol, which would be, ordinarily, 450 parts by weight of carbon tetrachloride.

The foregoing example of practice of my invention is only one of many possible embodiments of my invention, as my invention is capable of being practiced for a large number of purposes, for the separation or purification of many substances, and by the use of many solvents. For instance, trinitroxylol can be purified in the same manner as described in connection with trinitrotoluol, 100 parts of the trinitroxylol being washed with 100 parts of carbon tetrachloride. My invention is, therefore, by no means to be confined to these specific examples.

For instance, I can use ethyl alcohol, xylol, benzol, toluol, trichlorethylene, solvent naphtha, or a mixture of these solvents, for bringing about the desired purification of the crude nitrated toluol.

It will be seen that my process has the following advantages: The original amount of solvent and the total consumption of solvent are reduced as compared with said prior process, because, in the practice of my process, one of the two or more groups of constituents is not dissolved. Furthermore, the heat used in heating up the solvent in order to dissolve the mixture of solids, or of liquids and solids, or in the subsequent evaporation of a portion of the solution in order to bring about the concentration of the residual solution to the point where crystallization is brought about of the body present in the greatest concentration or of the body which is least soluble, in said prior process, is saved in my process. It will also be observed that I have provided a process in which a non-inflammable solvent is used, thereby avoiding the danger of fire and explosion due to the use of inflammable solvents, for the purpose mentioned.

I claim:

1. The process of purification of the crude product of nitration of toluol to obtain the trinitrotoluol of commerce, comprising subjecting said mixture to the action of carbon tetrachloride.

2. The process of purification of the crude product of nitration of toluol to obtain the trinitrotoluol of commerce, comprising subjecting said product to the action of carbon tetrachloride, and separating the desired isomer from the resultant solution by filtration.

3. The process of separating a mixture of trinitrotoluenes, comprising subjecting said mixture, in a porous condition, to the action of carbon tetrachloride.

4. The process of separating a mixture of trinitrotoluenes, comprising subjecting said mixture, in the form of porous pellets, to the action of carbon tetrachloride.

In testimony that I claim the foregoing I have hereunto set my hand.

CHARLES M. STINE.

Witnesses:
P. E. STRICKLAND,
F. B. GOODING.